United States Patent [19]

Schlosser et al.

[11] Patent Number: 4,836,179
[45] Date of Patent: Jun. 6, 1989

[54] PORTABLE BARBECUE GRILL WITH COVER SUPPORT

[75] Inventors: Erich J. Schlosser, Barrington; James C. Stephen, Arlington Heights, both of Ill.

[73] Assignee: Weber-Stephen Products Co., Palatine, Ill.

[21] Appl. No.: 231,874

[22] Filed: Aug. 12, 1988

[51] Int. Cl.⁴ ............................................. A47J 37/00
[52] U.S. Cl. ................................ 126/25 R; 126/41 R; 220/379; 220/85 CH; 16/110.5; 16/116 R
[58] Field of Search ..................... 126/9 R, 9 B, 25 R, 126/25 C, 25 A, 25 AA, 38, 41 R, 266; 220/85 CH, 379; 248/311.2; 16/110 R, 110.5, 116 R, DIG. 18, DIG. 24, DIG. 25

[56] References Cited
U.S. PATENT DOCUMENTS

| | | | |
|---|---|---|---|
| 4,523,574 | 6/1985 | Schlosser | 126/25 R |
| 4,535,749 | 8/1985 | Schlosser et al. | 126/25 R |
| 4,635,613 | 1/1987 | Tucker et al. | 126/25 R |
| 4,777,927 | 10/1988 | Stephen et al. | 126/25 R |

Primary Examiner—Samuel Scott
Assistant Examiner—Noah Kamen
Attorney, Agent, or Firm—Wallenstein Wagner & Hattis, Ltd.

[57] ABSTRACT

A portable barbecue grill includes a bowl (12) and a cover (14) having a gripping handle (44) with a carrying handle (50) pivoted on the bowl to lock the cover to the bowl. A latch member (60) cooperates with the carrying handle to define a cradle for the cover. The gripping handle includes two pieces that can be snap-fitted together.

6 Claims, 1 Drawing Sheet

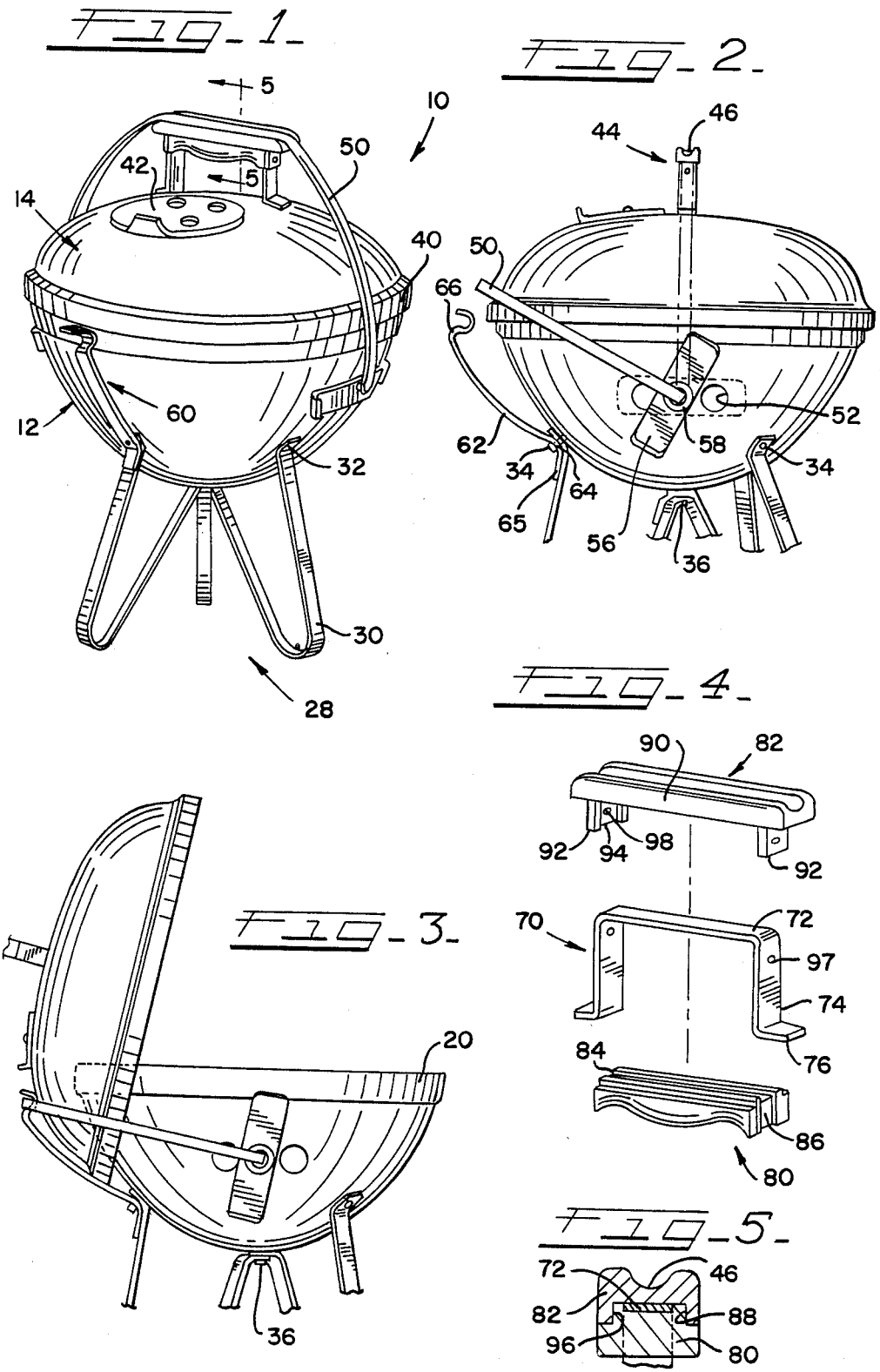

PORTABLE BARBECUE GRILL WITH COVER SUPPORT

DESCRIPTION

1. Technical Field

The present invention relates generally to outdoor cooking devices and, more particularly, to portable charcoal grills.

2. Background Prior Art

Charcoal grills have been marketed for a number of decades and generally consist of a lower charcoal support mechanism that has a cooking grid located adjacent its upper open end. Usually such devices have a cover for enclosing the lower portion during the cooking process to minimize the heat loss during the cooking process.

One such outdoor cooking device is the world famous Weber ® barbecue kettle has been marketed for at least three decades and the silhouette thereof is a registered trademark of Weber-Stephen Products Co., Palatine, Ill. The general silhouette configuration of the Weber ® barbecute kettle is disclosed in U.S. Pat. No. 3,538,906.

The Weber ® barbecue kettle consists of a generally hemispherical bowl that has a charcoal support grid in the lower portion thereof and vent openings to provide air for combustion of the coals. The hemispherical bowl is supported on a tripod leg arrangement that has a pair of wheels so that the unit can readily be moved about an area such as an outdoor deck. The kettle also has a generally hemispherical cover or lid that is supported on the upper open end which also has vent openings for providing air flow for combustion of the charcoal.

In order to remain competitive, manufacturers of outdoor cooking devices have constantly strived to improve their products to be more functional and more readily acceptable to the purchasing public. For example, U.S. Pat. No. 4,416,248, assigned to the assignee of the present invention, discloses an improvement in the basic Weber ® barbecue kettle.

In many instances, it is not practical to utilize the larger portable barbecue kelles of the type disclosed in the above-mentioned patents. For example, multi-story apartment dwellers and condominium owners many times have extremely limited outdoor space and, therefore, require a smaller, more portable unit. Thus, the assignee of the present invention has developed a smaller, more portable unit such as disclosed in U.S. Pat. No. 4,498,452.

Another segment of the purchasing public that desires a more portable type of unit is the camper. In order to meet this demand, the Assignee of the present invention also developed a portable barbecue grill that has a carrying handle and such unit is disclosed in U.S. Pat. No. 4,535,749. The portable barbecue grill disclosed therein consists of a generally hemispherical bowl supported on a tripod leg arrangement and a cover or lid. A carrying handle is pivoted on the bowl and locks the cover to the bowl in the carrying position. The bowl and cover have vent openings that caan be closed by vent covers.

SUMMARY OF THE INVENTION

According to the present invention, the barbecue grill disclosed in U.S. Pat. No. 4,535,749 has been made even more versatile by the addition of a single element so that the carrying handle or bar not only locks the cover to the bowl during movement thereof, but also forms part of a cradle for the cover when the grill is in use.

The specific improvement of the present invention is adapted to be incorporated into a portable barbecue grill that includes a bowl which is open at the top and has a cover or lid with a gripping handle thereon. The bowl is supported by a tripod leg arrangement. A carrying handle is pivoted on the bowl and adapted to be locked onto the gripping handle.

According to the present invention a deflectable strap has one end secured to the bowl adjacent the bottom thereof, preferably through a bolt that is also utilized for attaching one of the legs to the bowl. The free end of the strap, which is preferably spring steel, has a friction gripping means for gripping the carrying handle and holding the carrying handle in a position so that the carrying handle and the strap cooperate to define a cradle for holding the cover during the cooking process. Preferably, the cradle is configured such that the cover is in a generally vertical position to protect the coals from any wind that might be blowing at the time the cooking is being performed. Preferably, the upper free end of the metal strap has a generally C-shaped configuration in cross section and opens outwardly away from the bowl so that the strap can be moved inwardly and the carrying handle moved into alignment with the C-shaped opening and be frictionally gripped thereby.

According to another aspect of the present invention, the gripping handle is of unique construction to simplify the manufacture and assembly thereof. Thus, the gripping handle consists of a generally U-shaped bar or plate that has a web or base with a pair of legs extending from opposite ends thereof which are secured to the cover. The gripping handle consists of a pair of nonmetallic members, preferably plastic, that are assembled to each other to enclose the web.

More preferably, the upper member consists of a generally flat member that has a recess in the lower surface which receives a projection on the lower member and has a pair of legs which have inner slots that receive a portion of the metal member legs. A lower element has a projection having a recess that receives the web of the handle as well as a portion of the legs. The recess in the upper member preferably has a depth which is greater than the thickness of the metal strap and receives the projection of the lower member therein so that no metal parts are exposed after assembly. Preferably, the parts have corresponding projections and indents so that they can be snap-fitted together.

BRIEF DESCRIPTION OF DRAWINGS

FIG. 1 is a perspective view of the barbecue grill constructed in accordance with the teachings of the present invention;

FIG. 2 is a side view of the unit shown in FIG. 1;

FIG. 3 is a view of the grill with the cover in the open, supported position;

FIG. 4 is an exploded perspective view of the handle construction; and,

FIG. 5 is a cross-sectional view of the handle, as viewed along line 5—5 of FIG. 1.

DETAILED DESCRIPTION

While this invention is susceptible of embodiment in many different forms, there is shown in the drawings and will herein be described in detail a preferred embodiment of the invention with the understanding that the present disclosure is to be considered as an exemplification of the principles of the invention and is not intended to limit the broad aspect of the invention to the embodiment illustrated.

FIG. 1 of the drawings discloses a barbecue grill that is generally designated by reference numeral 10 and consists of a bowl 12 and a cover 14. The bowl 12 is generally semi-hemispherical in cross section and has an open top surrounded by a generally offset rim or lip 20 to produce a generally flat ledge which supports a cooking grid (now shown). A charcoal support grid (not shown) is located below the cooking grid.

The support structure 16 for the bowl 12 consists of a tripod leg arrangement 28 with three identical legs 30. Each leg 30 is generally U-shaped and has offset flanges 32 at opposite ends. One offset flange 32 is bolted to the bowl 12 through bolts 34 while the other flanges 32 are interconnected to each other through a bolt 36. It should be noted that the bolt 36 does not extend through the bowl and thus there is no opening in the bottom of the bowl that might become rusted during use. Prior experience has shown that the opening in the bottom of the bowl would allow excess lighter fluid to flow therethrough, which could ignite and burner the wooden deck, which normally supports the grill.

The cover 14 has a peripheral rim 40 adjacent the outer lower edge which is adapted to be received over the rim or lip 20 to close and seal the bowl. The cover also has a rotatable vent cover 42 for opening and closing vent openings in the cover (not shown).

A gripping handle 44 is secured to the top of the cover or lid 14 and is constructed in a manner that will be described later. The upper surface of the gripping handle 44 has an elongated recess 46 therein. A carrying handle 50, preferably consisting of a circular rod, has opposite ends angularly offset and received into openings (not shown) in the bowl 12 so that the handle is pivoted thereon. The carrying handle is configured such that in the undeflected condition the spacing between the offset ends is less than the spacing between the opening in the bowl. Thus, the handle can be assembled by expanding the opposite ends and aligning them with the openings in the bowl. Upon release, the offset ends will be biased into the openings.

The bowl 12 also has a pair of vent openings 52 located on opposite sides of the pivotal connections for the carrying handle 50 on the bowl 12. The carrying handle has a vent closure element 56 movable therewith to open and close the vent openings 52 when the handle is moved from the locked position shown in FIG. 1 to the open position shown in FIG. 3. The carrying handle has a washer 58 engaging a flattened portion (not shown) on the handle so that the bias on the handle will hold the vent cover 56 in the assembled position. In the locked position, the carrying handle 50 is received into the recess 46 on the gripping handle 44 to lock the cover to the bowl. The structure so far described is generally similar to that disclosed in U.S. Pat. No. 4,535,749, incorporated herein by reference.

According to the primary aspect of the present invention, a latch member has been provided to hold the carrying handle in a position to define a cradle for the cover when the cover is removed from the bowl. The latch member or means 60 is most clearly illustrated in FIGS. 1 and 2 and consists of an elongated strap or band 62 preferably formed of spring steel which has an offset portion 64 at one end and an angularly-related end 65. The offset portion has an opening (not shown) for the reception of the fastener 34 so that the strap is secured to the bowl adjacent its lower portion without any additional connection means. The angle between the end 65 and offset end 64 is less than the angle between the flange 32 and leg 30 so that the end 65 is drawn tight under compression when secured by the fastener 34.

The opposite end of the strap or latch member has a friction gripping means 66 formed thereon and this friction gripping means preferably is in the form of a C-shaped element in cross section that opens away from the bowl. The strap 62 preferably is configured such that in the undeflected position, the friction gripping means 66 is positioned to be spaced outwardly of the handle when the handle is moved generally to the position illustrated in FIG. 2.

Thus, to define the cradle for the cover 14, it is only necessary to deflect the latch member 60 inwardly a sufficient distance such that the carrying handle 50 clears the C-shaped element 66 and then pull the strap 62 so that the carrying handle or rod 50 is frictionally gripped by the friction element 66. In this position, the strap 62 and the carrying handle 50 cooperate to define an upwardly opening arcuate slot for receiving the cover and holding the cover in the position generally illustrated in FIG. 3.

Thus, it will be appreciated by the simple addition of one inexpensive, readily available component, the carrying handle can perform the dual function of locking the cover or lid to the bowl for carrying but also will function to define a cradle support for the cover when the grill is in use.

According to one further aspect of the present invention, the gripping handle 44 is constructed such that it can easily be assembled and will not transmit heat that is absorbed by the cover to the gripping portion. Thus, as illustrated in FIG. 4, the gripping handle consists of a generally U-shaped metal strap 70 that has a base 72 and a pair of legs 74 extending perpendicular therefrom. Flanges 76 extend perpendicular to the free ends of the legs 74 and are secured as by welding to the cover 14. The gripping means also includes a first non-metallic member 80 and a second non-metallic member 82 that are preferably formed from a plastic material. The first or lower non-metallic member 80 has an elongated recess 84 along the top surface thereof and recesses 86 at opposite ends. The elongated recess 84 has a width substantially equal to the width of the base 72 and has a depth equal to approximately the thickness of the base 72. The recess 84 is formed on a projection 88, for a purpose to be described later.

The upper member 82 consists of a main body 90 that has a pair of depending legs 92 extending therefrom. The legs 92 have recesses 94 that are adapted to receive a portion of the legs 74 while the main body 90 has an elongated recess 96 that has a width that is substantially equal to the width of the projection 88 of the lower member 80.

The legs 74 have openings 97 formed therein while the members 80 and 90 have protrusions 98 that are received into the openings 97 so that the handle can be assembled merely by manipulation of the parts to snap-fit the two members to the metal bar. In the assembled condition, shown in FIG. 5, the projection 88 is received into the recess 96 and completely encloses the metal web 72. The construction is such that the metal web 72 is never exposed, even if the thickness thereof is greater than the depth of the recess 84. Thus, it is apparent that the handle can easily be assembled without the use of any tools which the purchaser might not have readily available.

Of course, various modifications come to mind without departing from the spirit of the invention. For example, the interconnection between handle members 80, 82 could be a snap-fit of projections on legs 92 that fit over the lower edges of member 80.

While the specific embodiments have been illustrated and described, numerous modifications come to mind without significantly departing from the spirit of the invention and the scope of protection is only limited by the scope of the accompanying claims.

We claim:

1. A portable barbecue grill comprising a bowl having an open top and a cover on said bowl with a gripping handle on said cover and a carrying handle pivoted on said bowl and adapted to be locked on said gripping handle, the improvement of an elongated latch member for said carrying handle, said latch member having one end secured to said bowl adjacent a bottom portion thereof and an opposite free end adjacent said open top, said free end having a friction gripping means thereon, said friction gripping means consisting of a substantially C-shaped element opening away from said bowl for receiving said carrying handle, and said free end being deflectable toward and away from said bowl so that said handle can be locked onto said friction gripping means and said carrying handle and latch member define a cradle for said cover.

2. A portable barbecue grill as defined in claim 1, in which said carrying handle is a substantially circular rod.

3. A portable barbecue grill as defined in claim 2, in which said latch member is a metal strap.

4. A portable barbecue grill as defined in claim 1, further including a plurality of legs supporting said bowl, each of said legs being generally U-shaped and having one end interconnected to each other below said bowl and opposite ends connected to said bowl with said latch member connected to said bowl by a common connection with one of said legs.

5. A portable grill as defined in claim 4, in which said one end interconnection of said legs is generally aligned with a center axis of said bowl and is free of any connection to said bowl.

6. A portable grill as defined in claim 1, in which said gripping handle includes a generally U-shaped bar having a base and a pair of legs secured to said cover, first and second members covering said base, said first member having a recess and said second member having a projection received into said recess, said projection having a recess for receiving said base so that said base is completely enclosed by said members.

* * * * *